(12) United States Patent
Schmitt et al.

(10) Patent No.: US 9,734,479 B2
(45) Date of Patent: Aug. 15, 2017

(54) METHOD AND SYSTEM FOR OPTIMIZATION OF COMBINED CYCLE POWER PLANT

(71) Applicant: General Electric Company, Schenectady, NY (US)

(72) Inventors: Thomas P. Schmitt, Fairview, NC (US); Awadesh Kumar Tiwari, Bangalore (IN); Mahendhra Muthuramalingam, Bangalore (IN); Mahesh Kumar Asati, Bangalore (IN)

(73) Assignee: General Electric Company, Schenectady, NY (US)

( * ) Notice: Subject to any disclaimer, the term of this patent is extended or adjusted under 35 U.S.C. 154(b) by 703 days.

(21) Appl. No.: 14/184,872

(22) Filed: Feb. 20, 2014

(65) Prior Publication Data
US 2015/0235150 A1 Aug. 20, 2015

(51) Int. Cl.
G06G 7/48 (2006.01)
G06Q 10/06 (2012.01)
G05B 17/02 (2006.01)

(52) U.S. Cl.
CPC ........... G06Q 10/067 (2013.01); G05B 17/02 (2013.01)

(58) Field of Classification Search
CPC .............................. G06Q 10/067; G05B 17/02
USPC ................................................ 703/7; 705/348
See application file for complete search history.

(56) References Cited

U.S. PATENT DOCUMENTS

| 6,173,563 | B1 | 1/2001 | Vakil et al. |
| 7,742,904 | B2 | 6/2010 | Healy et al. |
| 8,423,161 | B2 | 4/2013 | Wilkes et al. |
| 2006/0178782 | A1* | 8/2006 | Pechtl .................. G05B 13/024 700/286 |
| 2010/0100248 | A1* | 4/2010 | Minto ..................... F01D 11/20 700/287 |
| 2012/0010758 | A1* | 1/2012 | Francino ................ G05B 17/02 700/291 |
| 2012/0070266 | A1* | 3/2012 | Schaberg ................ F01D 21/12 415/1 |
| 2014/0229012 | A1* | 8/2014 | Chandan .............. G05B 13/042 700/275 |

FOREIGN PATENT DOCUMENTS

EP 2549415 A1 1/2013

OTHER PUBLICATIONS

Colman "The Effect of Ambient Air and Water Temperature on Power Plant Efficiency". Apr. 2013. 35 Pages.*
Matsumoto et al., "Startup Optimization of a Combined Cycle Power Plant Based on Cooperative Fuzzy Reasoning and a Neural Network", IEEE Transactions on Energy Conversion, vol. 12, Issue No. 1, pp. 51-59, Mar. 1, 1997.

(Continued)

Primary Examiner — Eunhee Kim
(74) Attorney, Agent, or Firm — Nixon & Vanderhye P.C.

(57) ABSTRACT

A method for determining an operating set point for a combined cycle power plant, the method includes: simulating the operation of the power plant; correcting the simulation of the operation of the power plant; optimizing the simulation of the operation by simulating the operation at different operating settings and selecting at least one of the operating settings as being optimal, and generating the operating set point based on the optimized simulation of the power plant.

20 Claims, 2 Drawing Sheets

(56) References Cited

OTHER PUBLICATIONS

Makansi, "Plants Gain Confidence in Optimization Software", Power, vol. 142, Issue No. 5, pp. 59-64, Sep. 1, 1998.
European Search Report and Opinion issued in connection with corresponding EP Application No. 15154785.8 on Jul. 22, 2015.

* cited by examiner

METHOD AND SYSTEM FOR OPTIMIZATION OF COMBINED CYCLE POWER PLANT

BACKGROUND OF THE INVENTION

The present invention relates to control systems for a combined cycle power plant and systems which optimize the performance of such power plants.

Combined cycle power plants are typically used to generate electrical power delivered to a power grid. The power is distributed by the grid to consumers, such as residences, businesses and other consumers of electrical power. Combined cycle power plants are paid for the power delivered to the grid.

The price paid for power delivered to the grid varies based on the demand for power. The price may be higher for power delivered during normal business hours than for power delivered in the middle of the night. Similarly, the price may be higher during summer and winter than during fall and spring. Typically the prices are set periodically, such as each day, week or month. The prices are given to the power plants.

The operators of the plants use the prices to determine how much power to generate and deliver to the power grid. The operators also consider the cost to generate power by their power plants. The difference between the price for power and the cost to generate the power is a measure of the profitability of the power plant. The profitability of the power plant is an important indicator to the economic viability of the plant.

Determining the cost to generate power involves several factors, such as the cost of fuel and ambient conditions, such as outside temperature and humidity. The operating state of the gas and steam turbines in the power plant are also factors influencing the cost to generate power. Other factors affecting the cost to generate power and the power output capacity of the plant include the costs introduced by power augmentation devices, such as a chiller to cool the air entering a gas turbine and a duct firing system to supplement the generation of steam for the steam turbines. The relationship between these factors is complex. It has long been difficult to operate a combined cycle power plant with power augmentation devices in a manner that minimizes the cost of generating power and maximizes the profitability of the plant.

Similarly, the long term and short term variations in the demand for power are factors influencing the setting of the loads on the steam turbines and gas turbines in a combined cycle power plant. Steam turbines typically operate at a steady state to generate a constant amount of power. Gas turbines are well suited to produce varying amounts of power, such as for peak power during certain hours of a day.

Due to the complexities in determining the cost to generate power, variations in the price of power and variations in fuel cost, there is a long felt need for systems and methods to assist operators in controlling combined cycle power plants and in determining optimal operational settings for the power plant. The optimal operational settings would be useful to increase the profitability of the power plant and increase the effectiveness of the power plant in meeting a need for power by a power grid. The complexities in determining the optimal operational settings are greatly expanded when power augmentation equipment, such as air chillers and duct firing devices, are added to the power plant.

BRIEF SUMMARY OF THE INVENTION

A method has been conceived for determining an operating set point for a combined cycle power plant, the method includes: simulating the operation of the power plant; correcting the simulation of the operation of the power plant; optimizing the simulation of the operation by simulating the operation at different operating settings and selecting at least one of the operating settings as being optimal, and generating the operating set point based on the optimized simulation of the power plant.

In the method, the combined cycle power plant includes one or more gas turbines, one or more heat recovery steam generators (HRSG), one or more steam turbines, one or more chiller systems and one or more duct firing systems for the HRSG, wherein the simulation of the operation of the power plant includes digitally modeling each of the gas turbine, the steam turbine, the chiller system and the duct firing system and correlating the digital models using an artificial neural network.

The method may further comprise adjusting the simulation of the operation of the power plant using a Kalman filter which receives and compares data regarding the actual operation of the power plant to data regarding the simulation, wherein the Kalman filter generates adjustments applied to the simulation. The optimization of the simulated operation may include determining a cost of operating the plant at each of the different operating settings. The correction of the simulation may occur during a first period, and the optimization occurs during a second period that does not overlap with the first period.

A method has been conceived to determine an optimal operating setting for a combined cycle power plant including at least one each of: a gas turbine, a chiller system, a HRSG, a steam turbine and a duct firing device for the HRSG, the method comprising: modeling the thermodynamic performance of each of the gas turbine, the chiller system, the steam turbine and the duct firing system; simulating the thermodynamic performance of the power plant by correlating the modeling of the gas turbine, the chiller system, the steam turbine and the duct firing system; comparing the simulated thermodynamic performance to the actual thermodynamic performance of the power plant and determining a difference between the simulated thermodynamic performance and the actual thermodynamic performance; adjusting the modeling based on the comparison and reducing the difference; optimizing the simulation of the thermodynamic performance by simulating the thermodynamic performance of the power plant at various operating settings and selecting at least one of the operating settings as being optimal, and displaying the selected operating setting. The operator of the plant may adjust the plant settings based on the selected operational setting shown on the display.

The method may include comparing the simulated thermodynamic performance to the actual thermodynamic performance of the power plant during a first period, and the optimization occurs during a second period that does not overlap with the first period. The modeling of the thermodynamic performance of the chiller system may include an algorithm correlating the power needed to drive the chiller system to a desired temperature of inlet air entering the gas turbine, wherein the algorithm accounts for desired temperatures above and below the dew point of the inlet air. The comparison and the adjustment may be performed by a Kalman filter. The optimization may include determining a cost of operating the power plant at each of the various operating settings.

A thermo-economic controller has been conceived for a combined cycle power plant including at least one each of: a gas turbine, a chiller system, a HRSG, steam turbine and a duct firing device for the HRSG, the thermo-economic controller comprising a processor accessing a non-transitory memory storing digital instructions which when executed by the processor cause the controller to: model the thermodynamic performance of each of the gas turbine, the chiller system, the steam turbine and the duct firing system; simulate the thermodynamic performance of the power plant by correlating the modeling of the gas turbine, the chiller system, the steam turbine and the duct firing system; compare the simulated thermodynamic performance to the actual thermodynamic performance of the power plant and determining a difference between the simulated thermodynamic performance and the actual thermodynamic performance; adjust the modeling based on the comparison and to reduce the difference; optimize the simulation of the thermodynamic performance by simulating the thermodynamic performance of the power plant at various operating settings and selecting at least one of the operating settings as being optimal, and display the selected operating setting on a user interface device.

BRIEF DESCRIPTION OF THE DRAWINGS

The accompanying drawings in conjunction with the text of this specification describe an embodiment of the invention.

DETAILED DESCRIPTION OF THE INVENTION

Methods and systems have been conceived to assist operators of combined cycle power plants to determine optimal operational settings of a plant, increase the profitability of the plant and meet the needs of a power grid for power generation. The conceived methods and system include computer models of major components in a combined cycle power plant, an artificial neural network (ANN) interacting with the models to simulate the entire power plant, an optimizer to optimize the operation of the power plant based on the plant simulation, the price of power and the cost to generate power, and automatic calibration of the plant simulation using a Kalman Filter. The Kalman filter provides a closed control loop that allows the system to automatically calibrate the computer models of the major components and the simulation of the entire plant based on data of physical and thermodynamic operating conditions of the power plant. The methods and systems for optimizing the settings of a combined cycle power plant are applicable to other types of plants, such as a cogeneration power plant.

Figure 1:
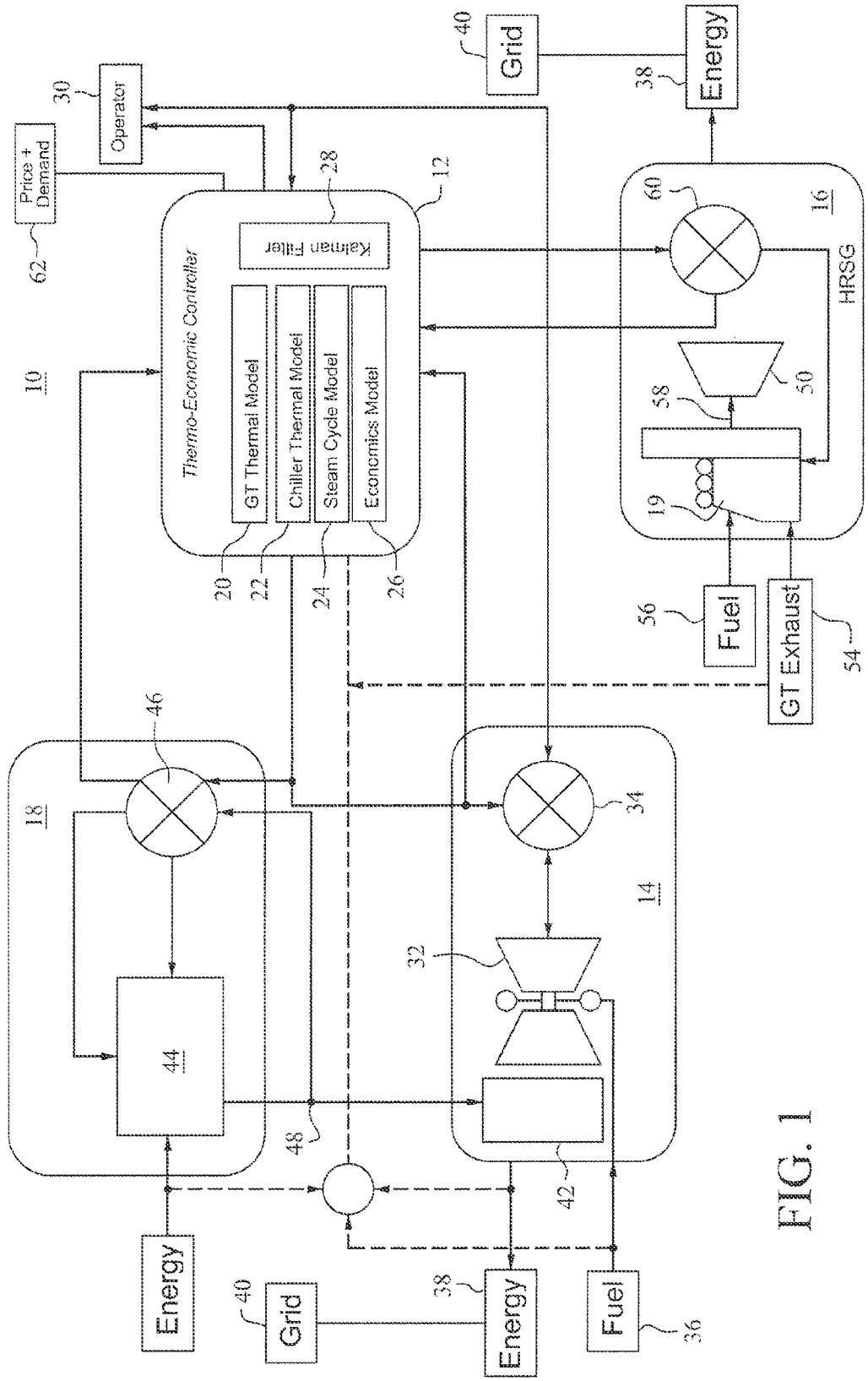
FIG. 1 is a diagram of a combined cycle power plant.

FIG. 1 is a schematic diagram of a combined cycle power plant 10 having a thermo-economic controller 12. The primary power generators in the power plant 10 are a gas turbine system 14 and a steam turbine system 16. Their power generation may be augmented by a chiller system 18 and a duct firing system 19. The chiller system cools the air entering the gas turbine to enhance the power generation capacity of the gas turbine. The duct firing system burns fuel to generate heat used to supplement the production and heating of steam flowing into the steam turbine. The duct firing system augments the hot exhaust gases from the gas turbine that are also used to produce and heat the steam.

The thermo-economic controller 12 simulates the operation of the entire combined cycle power plant 10. The thermo-economic controller includes or communicates with digital models, such as a gas turbine model 20, a chiller model 22 and a steam turbine model 24. Using these digital models, the thermo-economic controller 12 simulates the actual operation, e.g., thermodynamic performance, of the entire combined cycle power plant 10.

The thermo-economic controller 12 seeks optimal settings for operating the combined cycle power plant. An optimizer system, e.g., a digital software optimization program, may run the digital models at various operational settings and identify an optimal operational setting(s). The variations in the operational settings may be generated by perturbations applied to the value of one or more of the operational settings. The optimal setting(s) be determined based on the lowest cost to produce power by the plant or the maximum profitability of the plant.

To determine costs and profitability, the thermo-economic controller 12 includes or communicates with an economic model 26 that tracks the price of power and certain costs, such as the costs of fuels used in the gas turbine and duct firing system. The economic models provide data used by the thermo-economic controller to judge which of the operational setting(s) generated by the controller is best in terms of lowest cost or maximum profitability.

The thermo-economic controller 12 includes a Kalman filter 28 to assist in adjusting and calibrating the digital models so that they accurately simulate the thermodynamic operation of the power plant. The adjustment and calibration of the digital models are performed while the operating settings of the digital models are the same as the operational settings of the actual power plant. The Kalman filter may be used to adjust or calibrate the models and the artificial neural network (ANN) in real time or in near real time, such as every hour, day or week.

The thermo-economic controller 12 generates suggested operating settings for the power plant, such as power output (Megawatts—MW) for the gas turbine, the temperature and water mass flow for the chiller and the amount of duct firing. These suggested operating settings are provided to a human operator via a user interface device 30 such as a computer display screen, printer or sound speaker. Knowing the suggested operating settings, the operator inputs operating settings into control systems for the plant or for plant components, such as the gas turbine, chiller, HRSG, steam turbine and duct firing system. The control information causes the power plant to operate in the manner specified by the operator and as indicated by the control information. Alternatively, the thermo-economic controller 12 may directly input the suggested operating setting to the combined cycle power plant at the suggested operating settings.

The gas turbine system includes a gas turbine 32 and a control system 34 for the gas turbine. Fuel 36 flows to and powers the gas turbine. The gas turbine drives an electrical generator (not shown) to generate electrical energy 38 to be delivered to a power grid 40. The control system 34 for the gas turbine may be dedicated to the gas turbine. The control system 34 may set commands for the gas turbine regarding the fuel flow rate and receive data from the gas turbine such as the air inlet temperature and humidity, power output, shaft speed and temperatures of the exhaust gas. The control system 34 may also collect actual operating data from pressure and temperature sensors, flow control devices and other devices monitoring the gas turbine. Some of this operating data 29 may be transmitted to the Kalman filter 28.

The air entering the gas turbine may be cooled by cold water supplied to an inlet air duct 42 from the chiller system 18. Cooling the air entering a gas turbine augments the capacity of the gas turbine to generate power.

The chiller system 18 includes a refrigeration system 44 for cooling water and a control system 46. The control system 46 receives information regarding the temperature of the cooling water 48 and commands regarding the desired cooling of the intake air. These commands may come from the gas turbine controller 34. The control system 46 for the chiller system may also issue commands to cause the refrigeration system 44 to produce the cooling water 48 having a certain temperature and flow rate. The control system 46 sends data regarding the operation of the chiller system 18 to the thermo-economic controller 12.

The steam turbine system 16, e.g., an HRSG, includes a steam turbine 50 and a duct firing device 19, such as a furnace. Hot exhaust gas 54 from the gas turbine 32 are further heated or reheated by the duct firing device 19 to provide additional heat energy to produce steam 58. The steam powers the steam turbine 50 and drives a generator (not shown) to produce electrical energy 38 delivered to the grid 40. In some cases, the gas turbine and steam turbine are coupled to the same shaft line powering the same generator.

The control system 60 for the steam turbine sets the flow rate of fuel 56 burned by the duct firing device 19. Heat generated by the duct firing device increase the generation of steam 58 beyond the amount of steam produced by the exhaust gases from the gas turbine. The control system 60 sends data to the thermo-economic controller 12 regarding the operation of the steam system.

The controller 12 communicates with the operator 30 and external sources 62 to, for example, receive data on the prices and demand for power delivered to the grid 40. The thermo-economic controller 12 issues recommendations to the operator regarding desired operational settings to the gas turbine system 14, chiller system 18 and the steam system 16. The controller also receives and stores data on the operation of these systems 14, 18 and 16.

The thermo-economic controller 12 is a computer system having a processor and non-transitory memory storing data, the digital models 20, 22, 24 and 26, the optimization program 64, the Kalman Filter 28 and other computer programs. The computer system may be embodied in a single physical or virtual computing device or distributed over local or remote computing devices.

The digital models 20, 22, 24 may be embodied as a set of algorithms, e.g. transfer functions, that relate operating parameters of each of the systems. Each model 20, 22, 24 may be a physics-based aero-thermodynamic computer model, a regression-fit model, neural-net model, or other suitable computer model of the system represented by the model.

The models 20, 22, 24 and 26 may be regularly, automatically and in real-time or near real-time adjusted or calibrated using the Kalman filter 28. The Kalman filter 28 receives data inputs regarding actual physical and thermodynamic operating conditions of the combined cycle power plant 10. The data inputs may be supplied to the Kalman filter in real-time or near real-time, such as periodically every 15 minutes, every hour, every day, or weekly, during the operation of the power plant.

The Kalman filter compares the data inputs regarding actual operating conditions of the power plant to the same operating conditions predicted by the models and artificial neural network (ANN) 62 that simulate the operation of the power plant. Differences between the actual condition data and the predicted data are used by the Kalman filter to adjust the ANN and digital models. For example, the Kalman filter may generate performance multipliers applied to inputs or outputs of the digital models and ANN or modify the weights applied to the logic units and algorithms used in the ANN and digital models. These actions by the Kalman filter reduce the differences between the actual condition data and the predicted data. The Kalman filter 28 continues to operate to reduce the differences between the data of actual conditions and the data of the predicted conditions.

By way of example, the Kalman filter may generate performance multipliers for the predicted data regarding the compressor discharge pressure and temperature in the gas turbine, the efficiency of the gas and steam turbines, and the flow of fuel to the gas turbine and duct firing system. These types of data, e.g., representing compressor discharge pressure and temperature, efficiencies and fuel flow, reflect operating conditions that are subject to degradation of the performance of the power plant over time. By providing performance multipliers for these types of data, the Kalman filter may be particularly useful in adjusting the models and ANN to account for degradation in the performance of the power plant.

Figure 2:
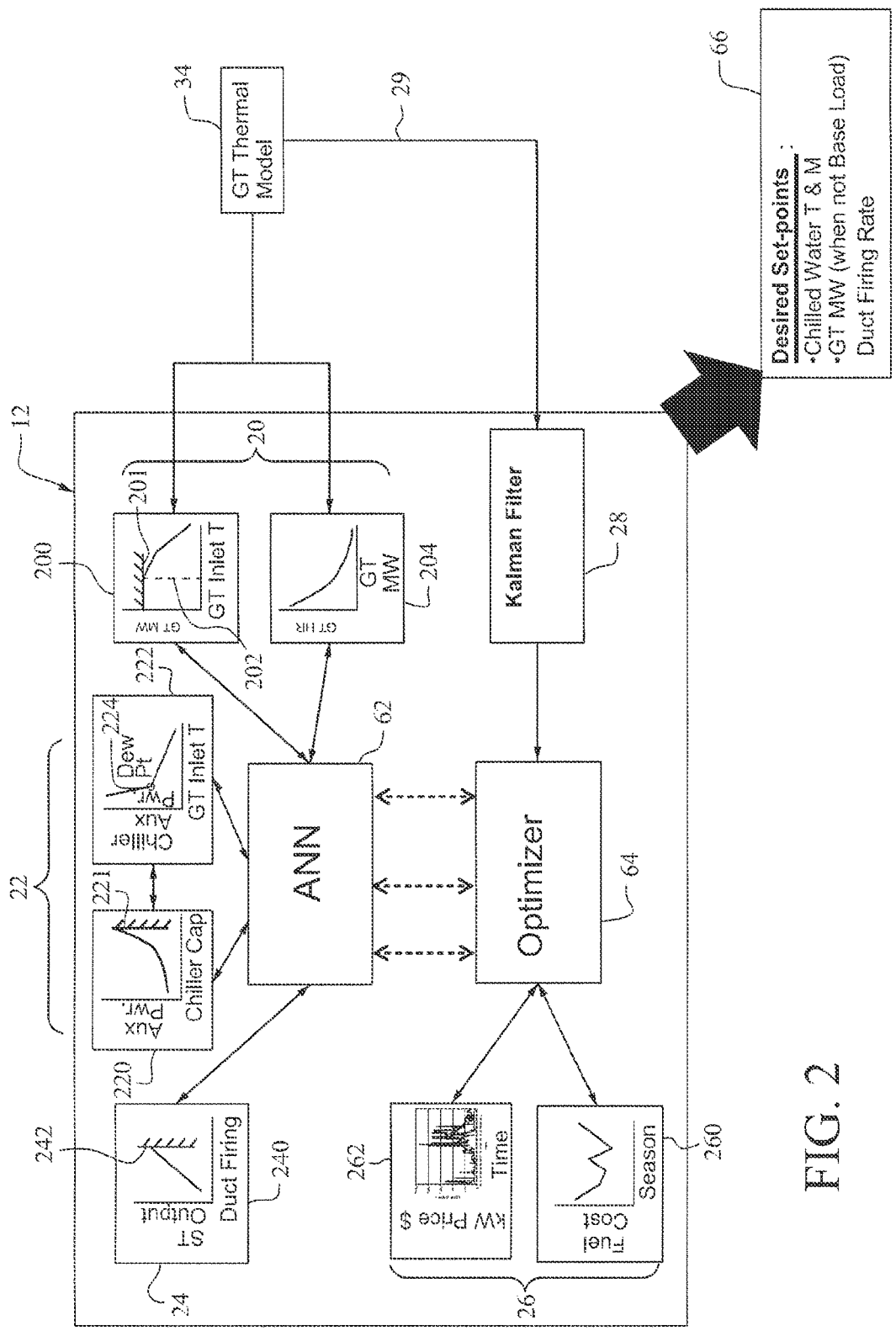
FIG. 2 is a diagram of a computer model of the combined cycle power plant, an artificial neural network, an optimization system and a Kalman Filter.

FIG. 2 is a schematic diagram of the thermo-economic controller 12. Each of the digital models 20, 22, 24 and 26 of components of the combined cycle power plant are represented by graphs illustrating algorithms used to model the corresponding system. The models interact and communicate with the ANN 62. The ANN connects the digital models together to form a model of the entire combined cycle power plant that simulates the thermodynamic operation of the plant. The ANN collects data outputted by the digital models and provides data to be used as inputs by the digital models.

The thermo-economic controller 12 also includes an optimization system 64, such as an optimization computer program, that interacts with the ANN to search for optimal settings of the gas turbine, chiller, steam turbine and duct firing device to achieve a defined goal. The goal may be to maximize the profitability of the combined cycle power plant. The optimization system may cause the ANN to run the digital models 20, 22 and 24 at various operational settings. The optimization system may have perturbation algorithms that assist in varying the operational settings of the models. The perturbation algorithms cause the simulation of the combine cycle power plant provided by the digital models and ANA to operate at settings different than the current operational setting for the plant. By simulating the operation of the plant at different settings, the optimization system searches for operational settings that would cause the plant to operate more economically.

The economic digital model 26 provides data (information) used by the optimization system 64 to determine which settings of the power plant are most profitable. The economic model 26 may, for example, receive and store fuel cost data formatted such as a chart 260 that correlates the cost of fuel over time, such as during the seasons of a year. Another chart 262 correlates the price received for electrical power (kilowatts—kW) at different times of a day, week or month. The economic model provides data regarding the price to be received for power and the cost of fuel (gas turbine fuel and duct firing fuel). This data from the economic model is used by the optimizer to evaluate each of the operational states of the combined cycle power plant. The optimizer may identify which of the operational states for the power plant that best meets the desired goal.

The digital models each simulate the operation of a component of the power plant, such as modeling the thermodynamic operation of the gas turbine, the chiller system or the steam turbine. The models may include algorithms such as mathematical equations and look-up tables that simulate the response of component to specific input conditions.

The digital model 20 of the gas turbine may include an algorithm 200 that correlates the effect of the temperature of the inlet air entering the gas turbine to the power output (MW) of the gas turbine. The algorithm may show that power output decreases from a maximum value 201, e.g., base load, as the inlet air temperature increases beyond a threshold 202 temperature.

The model 20 of the gas turbine may receive data from the controller 34 for the gas turbine. This controller 34 may include a digital model of the gas turbine.

The gas turbine digital model may also include an algorithm 204 that correlates the heat rate (HR) of the gas turbine at different power output levels (MW) of the gas turbine. Heat rate represents the efficiency of a gas turbine or other power generation system. Heat rate is inversely related to efficiency. A lower heat rate indicates a higher thermodynamic performance efficiency of the gas turbine.

The digital model 22 of the chiller system simulates the thermodynamic operation of this system in providing cool air to the gas turbine. The model 22 may include an algorithm 220 that correlates the amount of chilling capacity produced based on the energy (Aux. Pwr) applied to run the refrigeration system 44. The chilling capacity indicates the amount of cooling applied to the air entering the gas turbine. There may be a maximum chilling capacity value 221 that can be achieved by the chiller. A related algorithm 222 correlates the energy (Chiller Aux. Pwr) applied to run the refrigeration system 44 to the temperature of the chilled air entering a gas turbine. The power required to run the chiller increases dramatically to reducing the temperature of the air entering the gas turbine below the dew point 224 of the ambient air.

The digital model 24 of duct firing system 19 for the HRSG may include an algorithm 240 to correlate the power output of the steam turbine (ST Output) to the energy added by duct firing, such as the amount of fuel consumed by the duct firing. There may be an upper threshold level 242 to the increase in steam turbine output that can be achieved by the duct firing system.

The ANN 62 interacts with and provides communications between each of the digital models 20, 22 and 24 of the physical components of the power plant. The interaction includes collecting output data from the models and generating input data used by the models to generate the output data. The ANN may be a digital network of connected logic elements. The logic elements may each embody an algorithm that accepts data inputs to generate one or more data outputs. A simple logic element may sum the values of the inputs to produce output data. Other logic elements may multiple the values of the inputs or apply other mathematical relationships to the input date.

The data inputs to each of the logic elements of the ANN may be assigned a weight, such as multiplier between one and zero. The weights may be modified during a learning mode which adjusts the ANN to better model the performance of the combined cycle power plant. The weights may also be adjusted based on commands provided by the Kalman filter. Adjusting the weights of the data inputs to the logic units in the ANN is one example of means by which the ANN may be dynamically modified during operation of the combined cycle power plant. Other examples include modifying weights of data inputs to algorithms (which are an example of a logic unit) in each of the thermodynamic digital models for the steam turbine, chiller and gas turbine.

The thermo-economic controller 12 may be modified in other ways, such as be adjustments to the logic units and algorithms, based on the data provided by the optimizer and Kalman filter.

The thermo-economic controller 12 may generate and output to the user interface 30 of recommended set points 66 for the combined cycle power plant. These recommended set points 66 may include: a temperature and mass flow rate (T&M) for the cooling water generated by the chiller and used to cool the air entering the gas turbine; a power output (MW) for the gas turbine of the gas turbine if not set to its base load; and the duct firing rate for the HRSG.

By way of example, the thermo-economic controller 12 may be used to properly optimize the setting of the chiller system 18. The power needed to drive the refrigeration system 44 dramatically increases if the cooling duct 42 is set to cool the gas turbine inlet air below the dew point 224. This power increase is accounted for in the relationship 222 between gas turbine inlet air temperature and power required for the chiller system. Because this relationship 222 is incorporated into the thermo-economic controller 12, the optimization of the simulation of the plant by the controller takes into account that cooling gas turbine inlet air below the dew point dramatically increases the power required by the chiller system.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method for determining an operating set point for a combined cycle power plant including a gas turbine, a heat recovery steam generator (HRSG), a steam turbine, and a duct firing system for the HRSG, the method comprising:
   using digital models to model the operation and/or the performance of the gas turbine, the steam turbine and the duct firing system;
   correlating the digital models using an artificial neural network, the artificial neural network interacting with the digital models;
   simulating the operation and/or the performance of the power plant using the digital models and the artificial neural network;
   correcting the simulation of the operation and/or the performance of the power plant by adjusting at least one of the digital models and/or the artificial neural network;
   optimizing the simulation of the operation and/or performance of the power plant by simulating the operation and/or performance of the power plant using the digital models and the artificial neural network at different operating settings of at least one of the power plant, the gas turbine, the steam turbine and the duct firing system, and selecting at least one of the operating settings as being an optimal operating setting; and
   setting an operating set point for the power plant based on the optimal operating setting.

2. The method of claim 1 further comprising adjusting the simulation of the operation of the power plant using a Kalman filter which receives and compares data regarding actual operation of the power plant to data regarding the simulation of the operation of the power plant, wherein the Kalman filter generates adjustments applied to the simulation.

3. The method of claim 1 wherein the optimization of the simulated operation includes determining a cost of operating the plant at each of the different operating settings.

4. The method of claim 1 wherein the correction of the simulation occurs during a first period, and the optimization occurs during a second period that does not overlap with the first period.

5. A method to determine an optimal operating setting for a combined cycle power plant including a gas turbine, chiller system, steam turbine and duct firing device, the method comprising:
modeling thermodynamic performance of the gas turbine, the chiller system, the steam turbine and the duct firing system by a plurality of digital models which simulate thermodynamic performance of the gas turbine, the chiller system, the steam turbine and the duct firing system;
simulating the thermodynamic performance of the power plant by using an artificial neural network to correlate the plurality of digital models of the gas turbine, the chiller system, the steam turbine and the duct firing system;
comparing the simulated thermodynamic performance of the power plant to actual thermodynamic performance of the power plant and determining a difference between the simulated thermodynamic performance of the power plant and the actual thermodynamic performance of the power plant;
adjusting at least one of the plurality of digital models and/or the artificial neural network based on the comparison and reducing the difference;
optimizing the simulated thermodynamic performance of the power plant by simulating the thermodynamic performance of the power plant at various operating settings and selecting at least one of the operating settings as being optimal; and
displaying the selected operating setting.

6. The method of claim 5 wherein the comparing of the simulated thermodynamic performance of the power plant to the actual thermodynamic performance of the power plant occurs during a first period, and the optimization occurs during a second period that does not overlap with the first period.

7. The method of claim 5 wherein the digital model simulating the thermodynamic performance of the chiller system includes an algorithm correlating power needed to drive the chiller system to a desired temperature of inlet air entering the gas turbine, wherein the algorithm accounts for desired temperatures above and below the dew point of the inlet air.

8. The method of claim 5 wherein the comparing and the adjusting is performed by a Kalman filter.

9. The method of claim 5 wherein the optimization includes determining a fuel cost corresponding to operating the power plant at each of the various operating settings.

10. A thermo-economic controller for a combined cycle power plant including at least one of each of a gas turbine, a heat recovery steam generator (HRSG), a steam turbine, a chiller system and a duct firing system for the HRSG, the thermo-economic controller comprising a processor accessing a non-transitory memory storing digital instructions which when executed by the processor cause the controller to:
model thermodynamic performance of the gas turbine, the chiller system, the steam turbine and the duct firing system by digital models each simulating thermodynamic performance of one or more of the gas turbine, the chiller system, the steam turbine and the duct firing system;
simulate the thermodynamic performance of the power plant by using the digital models and an artificial neural network which interacts with and correlates the modeling of the gas turbine, the chiller system, the steam turbine and the duct firing system;
compare the simulated thermodynamic performance of the power plant to actual thermodynamic performance of the power plant and determining a difference between the simulated thermodynamic performance of the power plant and the actual thermodynamic performance of the power plant;
adjust at least one of the digital models and/or the artificial neural network based on the comparison and thereby reducing the difference;
optimize the simulated thermodynamic performance of the power plant by simulating the thermodynamic performance of the power plant at various operating settings and selecting at least one of the operating settings as being optimal; and
display the selected operating setting on a user interface device.

11. The method according to claim 1, wherein each of the digital models is embodied as an algorithm that relates operating parameters of its simulating component.

12. The method according to claim 1, wherein each of the digital models includes one or more algorithms that simulate at least one data output of its simulating component in response to one or more data inputs.

13. The method according to claim 1, wherein the artificial neural network is a digital network of connected logic elements, and each of the logic elements is embodied as an algorithm, the algorithm accepting one or more data inputs and generating at least one data output in response to the one or more data inputs.

14. The method according to claim 13, wherein the artificial neural network is adjusted by adjusting a weight assigned to one of the logic elements.

15. The method according to claim 14, wherein the weight is adjusted based on a command provided by a Kalman filter.

16. A thermo-economic controller for a combined cycle power plant including a gas turbine, a heat recovery steam generator (HRSG), a steam turbine and a duct firing system for the HRSG, the thermo-economic controller comprising a processor accessing a non-transitory memory storing instructions which when executed by the processor cause the controller to:
model performance of the gas turbine, the steam turbine and the duct firing system of the power plant by digital models each simulating performance of one or more of the gas turbine, the steam turbine and the duct firing system;
correlate the digital models using an artificial neural network, the artificial neural network connecting and interacting with the digital models;
simulate operation and/or performance of the power plant using the digital models and the artificial neural network;
adjust one or more of the digital models and the artificial neural network to reduce a difference between the simulated operation and/or performance of the power plant and an actual performance of the power point;
optimize the simulation of the operation and/or performance of the power plant by simulating the operation and/or performance of the power plant at different operating settings of the power plant and selecting at least one of the different operating settings as an optimal operating setting; and generate an operating set point for the power plant based on the optimal operating setting.

17. The method according to claim 16, wherein each of the digital models includes one or more algorithms that simulate at least one data output of its simulating component in response to one or more data inputs.

18. The method according to claim 16, wherein the artificial neural network is a digital network of connected logic elements, and each of the logic elements is embodied as an algorithm that accepts one or more data inputs and generates at least one data output in response to the one or more data inputs.

19. The method according to claim 18, wherein the artificial neural network is adjusted by adjusting a weight assigned to one of the logic elements.

20. The method according to claim 19, wherein the weight is adjusted based on a command provided by a Kalman filter.

\* \* \* \* \*